Patented July 24, 1934

1,967,433

UNITED STATES PATENT OFFICE 1,967,433

METHOD OF PRODUCING ALIPHATIC AND HYDRO-AROMATIC OXIDES

Walter Schoeller and Erwin Schwenk, Berlin-Westend, and Erich Borgwardt, Berlin-Pankow, and Franz Aichner, Berlin, Germany, assignors to Schering-Kahlbaum A. G., Berlin, Germany No Drawing. Application January 9, 1932, Serial No. 585,796. In Germany January 14, 1931

4 Claims. (Cl. 260—156.5)

Our invention relates to the production of aliphatic and alicyclic oxides and one of its objects is to provide means whereby such compounds can be produced in a particularly simple and efficient manner.

We have found that if the vapor of a halogen-substituted compound which, besides the halogen and adjoining it, contains a hydroxyl group, is conducted in contact with an oxide or salt of magnesium or copper, hydrogen halide is split off, the hydrogen atom of the hydroxyl group combining with the halogen atom, an oxide ring being formed according to the formula

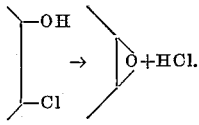

We have found that we can use as catalysts metal oxides or salts of the metals mentioned above, preferably deposited, by precipitation or otherwise, on a carrier substance such as kieselguhr or pumice stone. We have further found it useful to admix to the vapor of the halogen compound another vapor such as for instance steam.

In practising our invention we may for instance produce ethylene oxide or menthene oxide as follows:

Example 1

100 parts by weight ethylene chlorhydrin are conducted in the form of vapor in contact with and past a catalyst formed of magnesia deposited on a carrier substance such as kieselguhr, a temperature of 250° C. being maintained. The ethylene oxide formed in the reaction is preferably collected in a solvent such as water or alcohol. In this manner we have obtained about 80% of the calculated quantity.

Example 2

Menthol chloride (see Journal für praktische Chemie, Vol. 119, p. 21) is conducted together with steam in contact and past a catalyst, for instance cupriphosphate deposited on pumice stone, at a temperature of 300–330° C. and the vapors formed in the reaction are condensed. The oil collecting above the watery hydrochloric acid solution is separated by decantation and subjected to fractionated distillation. We have thus obtained a fair yield of menthene oxide forming a colorless liquid boiling, at a pressure of 13 mms mercury column, between 72 and 79° C.

Various changes may be made in the details disclosed in the foregoing specification without departing from the invention or sacrificing the advantages thereof.

We claim:—

1. The method of producing aliphatic and alicyclic oxides comprising conducting the corresponding halogen compound which contains besides the halogen atom and adjoining same a hydroxyl group, in the form of vapor in contact with a catalytically active substance of the group of substances formed by the oxides and salts of magnesium and copper.

2. The method of producing aliphatic and alicyclic oxides comprising conducting the corresponding halogen compound which contains besides the halogen atom and adjoining same a hydroxyl group, in the form of vapor together with steam in contact with a catalytically active substance of the group of substances formed by the oxides and salts of magnesium and copper.

3. The method of producing ethylene oxide, comprising conducting ethylene chlorohydrin in the form of vapor at a temperature of about 250° C. in contact with magnesia.

4. The method of producing menthene oxide, comprising conducting the vapor of mentho chloride together with steam at a temperature of 300–330° C. in contact with cupriphosphate.

WALTER SCHOELLER,
ERWIN SCHWENK,
ERICH BORGWARDT,
FRANZ AICHNER.